United States Patent Office 3,758,492
Patented Sept. 11, 1973

3,758,492
1-(1,3,4-THIADIAZOL-2-YL)-IMIDAZOLIDINONE-(2) COMPOUNDS

Carl Metzger, Wuppertal-Elberfeld, Dietrich Rucker, Bietigheim, near Ludwigsburg, and Ludwig Eue, Cologne, Germany, assignors to Bayer Aktiengesellschaft, Leverkusen, Germany
No Drawing. Filed Mar. 16, 1971, Ser. No. 124,917
Claims priority, application Germany, Mar. 20, 1970,
P 20 13 407.0
Int. Cl. C07d 99/10
U.S. Cl. 260—306.8 D          16 Claims

ABSTRACT OF THE DISCLOSURE

Certain novel 1-(1,3,4-thiadiazol-2-yl)-imidazolidinone-(2) of the formula:

$$\begin{array}{c} \text{N---N} \quad \overset{OR^2}{\underset{}{|}} \overset{OR^3}{\underset{}{|}} \\ R-\underset{S}{\diagdown}\diagup -N \quad N-R^1 \\ \qquad\qquad \underset{O}{\|} \end{array}$$

in which

R is hydrogen, alkyl, haloalkyl, cycloalkyl, alkoxy, alkoxyalkyl, halocycloalkyl, alkoxyalkylthio, optionally substituted aryl, alkenyl, alkynyl, alkylthio, alkenylthio, alkynylthio, aralkylthio, alkylsulfoxyl, alkylsulfonyl, alkenylsulfoxy, alkenylsulfonyl, alkynylsulfonyl, alkynylsulfonyl, aralkylsulfoxyl or aralkylsulfonyl, $R^1$ is lower alkyl, alkenyl or alkynyl, $R^2$ is an acyl radical of the formula $R^4$ —CO— wherein $R^4$ is lower alkyl, haloalkyl, optionally substituted aryl, lower alkoxy or a radical of the formula $$\begin{array}{c} R^5 \\ \diagdown \\ \diagup N- \\ R^6 \end{array}$$

wherein $R^5$ is hydrogen, lower alkyl or possibly substituted aryl, and $R^6$ is alkyl or possibly substituted aryl, and $R^3$ stands for any of the radicals for which $R^2$ may stand or lower alkyl or alkenyl;

are outstandingly effective herbicides with particularly selective action.

The present invention relates to certain new 1-1,3,4-thiadiazol-2-yl)-imidazolidinone-(2) compounds, to herbicidal compositions containing them and to their use as herbicides.

It is known that thiazolylureas, for example 1-(4-methyl-1,3-thiazol-2-yl)-3-methylurea, can be used as herbicides (see Belgian patent specification 679,138). The herbicidal potency of these previously known ureas, however, is relatively low and therefore not always satisfactory under conditions obtaining in practice.

It was very surprising that the active compounds according to the invention exhibit a higher herbicidal activity with, at the same time, selectivity in respect of agricultural cultivated plants, than the previously known thiazolylureas.

The compounds of the present invention are 1-(1,3,4-thiadiazol-2-yl)-imidazolidinone-(2) derivatives of the general formula:

$$\begin{array}{c} \text{N---N} \quad \overset{OR^2}{\underset{}{|}} \overset{OR^3}{\underset{}{|}} \\ R-\underset{S}{\diagdown}\diagup -N \quad N-R^1 \\ \qquad\qquad \underset{O}{\|} \end{array} \quad (I)$$

in which

R is hydrogen, alkyl, haloalkyl, cycloalkyl, alkoxy, alkoxyalkyl, halocycloalkyl, alkoxyalkylthio, optionally substituted aryl, alkenyl, alkynyl, alkylthio, alkynylthio, alkynylthio, aralkylthio, alkylsulfoxyl, alkylsulfonyl, alkenylsulfoxy, alkenylsulfonyl, alkynylsulfoxyl, alkynylsulfonyl, aralkylsulfoxyl or aralkylsulfonyl, R1 is lower alkyl, alkenyl or alkynyl, $R^2$ is an acyl radical of the formula $R^4$ —CO— wherein $R^4$ is lower alkyl, haloalkyl, optionally substituted aryl, lower alkoxy or a radical of the formula $$\begin{array}{c} R^5 \\ \diagdown \\ \diagup N- \\ R^6 \end{array}$$

wherein $R^5$ is hydrogen, lower alkyl or possibly substituted aryl, and $R^6$ is alkyl or possibly substituted aryl; and $R^3$ stands for any of the radicals for which $R^2$ may stand or lower alkyl or alkenyl.

R is preferably hydrogen, alkyl of from 1 to 4 carbon atoms, haloalkyl of from 1 to 4 carbon atoms, cycloalkyl of from 5 to 8 carbon atoms, alkoxy of from 1 to 4 carbon atoms, alkoxyalkyl of from 1 to 4 carbon atoms in each of the alkyl and alkoxy moieties, halocycloalkyl of from 5 to 8 ring carbon atoms, alkoxyalkylthio of from 1 to 4 carbon atoms in each of the alkyl and alkoxy moieties, possibly substituted aryl of from 6 to 10 carbon atoms, alkenyl of from 2 to 4 carbon atoms, alkynyl of from 2 to 4 carbon atoms, alkylthio of from 1 to 4 carbon atoms, possibly substituted aralkylthio of from 6 to 10 carbon atoms in the aryl moiety and 1 to 4 carbon atoms in the alkyl moiety, alkenylthio of from 2 to 4 carbon atoms, alkynylthio of from 2 to 4 carbon atoms, alkylsulfoxyl of from 1 to 4 carbon atoms, alkylsulonyl of from 1 to 4 carbon atoms, alkenylsuloxyl of from 2 to 4 carbon atoms, alkenylsulfonyl of from 2 to 4 carbon atoms, alkenylsulfonyl of from 2 to 4 carbon atoms, alkynylsulfoxy of from 2 to 4 carbon atoms, alkynylsulfonyl of from 2 to 4 carbon atoms, aralkylsulfoxyl and aralkylsulfonyl of from in each case, 6 to 10 carbon atoms in the aryl moiety and 1 to 4 carbon atoms in the alkylene moiety.

$R^1$ stands preferably for alkyl of from 1 to 4 carbon atoms, or alkenyl or alkynyl of from, in each case, 2 to 4 carbon atoms.

It has surprisingly been found that these compounds exhibit strong herbicidal properties.

The invention also provides a process for the production of a 1-(1,3,4-thiadiazol-2-yl)-imidazolidinone-(2) derivative of the Formula I in which a 1 - (1,3,4-thiadiazol-2-yl)-5-hydroxyimidazolidinone-(2) of the general formula:

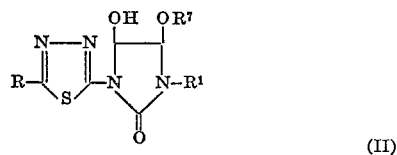

(II)

in which

R and R¹ have the meanings stated above and
R⁷ stands for hydrogen or lower alkyl or alkenyl, (R⁷ is preferably hydrogen, alkyl of from 1 to 4 carbon atoms or alkenyl of from 2 to 4 carbon atoms)

is reacted with either (a) an acid derivative of the general formula $$R^8—CO—X \quad (III)$$

in which R⁸ stands for any of the radicals for which R⁴ may stand (other than lower alkoxy and other than

when R⁵ stands for hydrogen) and X stands for chlorine, bromine or a radical of the formula R⁸—CO—O— (provided that R⁴ does not stand for

or (b) an isocyanate of the general formula $$R^6—N=C=O \quad (IV)$$

in which R⁶ has the meaning stated above.

The reaction may be carried out in the presence of a solvent and/or (in variant (a)) in the presence of an acid-binding agent.

If 1 - (5-trifluoromethyl-1,3,4-thiadiazol-2-yl)-3-methyl-4-methoxy - 5-hydroxyimidazolidinone-(2) and chloroacetyl chloride are used as starting materials, the reaction course of process variant (a) can be represented by the following reaction scheme:

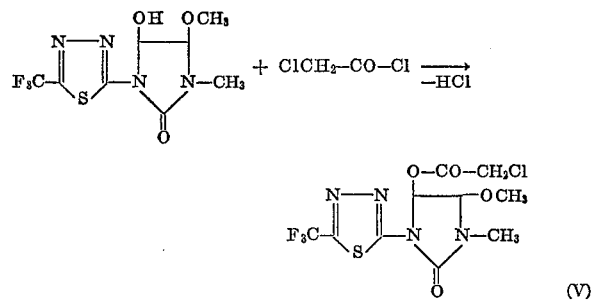

(V)

If 1 - (5-methylsulfonyl-1,3,4-thiadiazol-2-yl)-3-methyl-methyl - 4,5 - dihydroxyimidazolidinone-(2) and ethyl isocyanate are used as starting materials, the reaction course of process variant (b) can be represented by the following formula scheme:

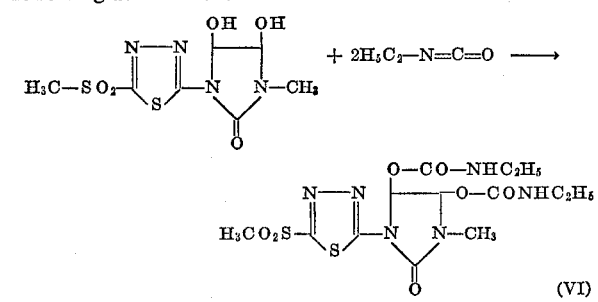

(VI)

The 1 - (1,3,4 - thiadiazol-2-yl)-5-hydroxy-imidazolidinones-(2) to be used as starting materials are defined generally by the Formula II.

The 1 - (1,3,4 - thiadiazol - 2-yl)-5-hydroxy-imidazolidinones-(2) according to Formula II used as starting materials are not yet known but can be prepared by reacting 1,3,4-thiadiazol-2-yl ureas (which are known), in the presence of alkaline catalysts and optionally in the presence of a diluent, with glyoxal at temperatures of 40–80° C.; in this way, 1-(1,3,4-thiadiazol-2-yl)-4,5-dihydroxyimidazolidinones-(2) of the Formula II are obtained. Compounds of the Formula II in which R⁷ stands for lower alkyl or alkenyl can be prepared therefrom by reacting these 1 - (1,3,4-thiadiazol-2-yl)-4,5-dihydroxy-imidazolidinones-(2) with alcohols such as methanol or ethanol in the presence of acidic catalysts, for example sulfuric acid. These processes are illustrated by the following preparative examples:

(i)

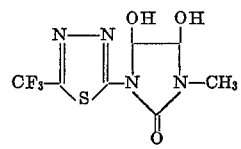

100 ml. of a 30%-strength aqueous glyoxal solution, which had been adjusted to pH 7 to 8 with dilute sodium hydroxide solution, were added dropwise to a solution of 45.4 g. (0.2 mole) 1-(5-trifluoromethyl-1,3,4-thiadiazol-2-yl)-3-methylurea in 500 ml. ethanol. After standing overnight, the solvent was distilled off in a vacuum, and water was added to the residue. After recrystallization from acetonitrile, 1 - (5 - trifluoromethyl-1,3,4-thiadiazol-2-yl)-3-methyl-4,5-dihydroxyimidazolidinone-(2) was obtained in crystalline form; melting point 178° C.

In corresponding manner, the following compounds can also be prepared:

(ii) 1 - (5 - methylthio-1,3,4-thiadiazol-2-yl)-3-methyl-4,5-dihydroxy-imidazolidinone-(2) of the melting point 55° C.

(iii) 1-(5 - methylsulfonyl - 1,3,4 - thiadoazol-2-yl) - 3-methyl-4,5 - dihydroxy-imidazolidinone-(2) of the melting point 67° C.

(iv)

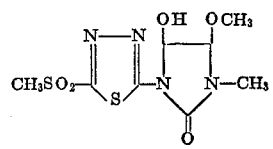

43.9 g. (0.15 mole) 1-(5-methylsulfonyl-1,3,4-thiadiazol-2-yl)-3-methyl - 4,5 - dihydroxyimidazolidinone - (2) were heated under reflux with 100 ml. of absolute methanol and 2 ml. of concentrated sulfuric acid for 24 hours. Concentration in a vacuum was then affected. After trituration, 1-(5-methylsulfonyl - 1,3,4 - thiadiazol - 2 - yl)-3-methyl-4-methoxyimidazolidinone - (2) crystallized out and was recrystallized from methanol; melting point 140° C.

In corresponding manner, the following compounds can also be prepared:

(v) 1-(5 - trifluoromethyl-1,3,4-thiadiazol-2-yl)-3-methyl-4-methoxy - 5 - hydroxy-imidazolidinone-(2), melting point 148° C., and (vi) 1-(5-methylsulfonyl - 1,3,4 - thiadiazol) - 3 - methyl-4-ethoxy - 5 - hydroxy-imidazolidinone-(2), melting point 141° C.

As solvents for the reaction according to the invention of the 1-(1,3,4-thiadiazol-2-yl)-5-hydroxyimidazolidinone-(2) of the Formula II with acid derivatives of the Formula III or isocyanates of the Formula IV, all inert organic solvents are suitable. These include for example: hydrocarbons, such as benzene, ligroin, hexane, benzene, toluene; chlorinated hydrocarbons, such as methylene chloride, chloroform, carbon tetrachloride, chlorobenzene; nitrated hydrocarbons, such as nitrobenzene; ethers, such as diethyl ether, dibutyl ether, tetrahydrofuran, dioxan; ketones, such as acetone methylisopropyl ketone, acetophenone, cyclohexanone; and any desired mixtures of these solvents.

As acid-binder in process variant (a), all customary acid-binding agents can be used. Preferred agents include the alkali metal hydroxides, alkaline earth metal hydroxides, alkali metal carbonates and tertiary amines. Particularly suitable sodium hydroxide, sodium carbonate, triethylamine and pyridine.

The reaction temperatures can be varied within fairly wide range. In general, the reaction is carried out at 0° to 140° C., preferably 10° to 120° C.

When carrying out the process according to the invention the starting materials are generally used in approximately equimolar or double molar amounts. Working up of the reaction mixture may be effected in customary manner.

The following examples are illustrative.

EXAMPLE 1

Preparation of 1-(5-trifluoromethyl-1,3,4-thiadiazol-2-yl)-methyl-4,5-diacetoxyimidazolidinone-(2)

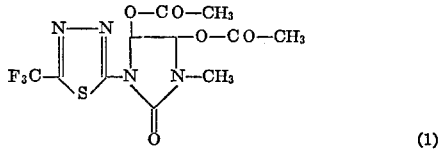

(1)

42.6 g. (0.15 mole) 1-(5-trifluoromethyl-1,3,4-thiadiazolyl)-3-methyl - 4,5 - dihydroxyimidazolidinone - (2) were heated to 100° C. for 2 hours in 150 ml. acetic anhydride with addition of 3 drops of concentrated sulfuric acid. After this, concentration in a vacuum was effected. After recrystallization of the soild residue from alcohol 1-(5-trifluoromethyl - 1,3,4 - triadiazol-2-yl)-3-methyl-4,5-diacetoxyimidazolidinone-(2) was obtained in crystalline form. Melting point 138° C.

EXAMPLE 2

Preparation of 1-(5-trifluoromethyl-1,3,4-thiadiazol-2-yl)-3-methyl-4-methoxy - 5 - N - methylcarbamoylimidazolidinone-(2)

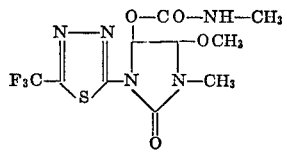

4.4 g. (0.015 mole) 1-(5-trifluoromethyl-1,3,4-thiadiazol-2-yl) - 3 - methyl-4-methoxy-5-hydroxyimidazolidinone-(2) were heated under reflux for 5 hours in 8 ml. acetic anhydride with addition of 2 g. sodium acetate. After dilution with water, the percipitate was filtered off with suction and recrystallized from methanol. Melting point 96° C.

EXAMPLE 3

Preparation of 1-(5-trifluoromethyl - 1,3,4 - thiadiazol-2-yl) - 3 - methyl-4-methoxy-5-chloroacetylimidazolidinone-(2)

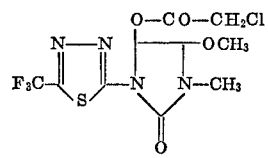

(3)

3 g. (0.03 mole) triethylamine and 3.4 g. (0.03 mole) chloroacetyl chloride were added to 8.95 g. (0.03 mole) 1-(5-trifluoromethyl - 1,3,4 -thiadiazol - 2 - yl)-3-methyl-4-methoxy-5-hydroxyimidazolidinone-(2) in 50 ml. tetrahydrofuran. Stirring under reflux for 1 hour and suction filtration from triethylamine hydrochloride precipitate. The filtrate was concentrated, the 1-(5-trifluoromethyl-1,3,4-thiadiazol-2-yl)-3-methyl - 4 - methoxy - 5 - chloroacetylimidazolidinone-(2) separated in crystalline form. It was recrystallised from benzene/hexane (3:1). Yield 60% of the theory; melting point 139° C.

EXAMPLE 4

Preparation of 1-(5-trifluoromethyl-1,3,4-thiadiazol-2-yl)-3-methyl-4,5-di-N-methylcarbamoylimidazolidinone-(2)

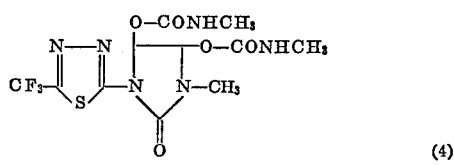

(4)

20 g. (0.35 mole) methylisocyanate were added dropwise at 20°, with stirring, to 42.6 g. (0.15 mole) 1-(5-trifluoromethyl-1,3,4-thiadiazolyl) - 3 - methyl - 4,5 - dihydroxyimidazolidinone-(2) in 250 ml. tetrahydrofuran. After subsidence of the heat evolution, stirring was continued for a further 2 hours at 60° and the solvent was then removed in a vacuum. After recrystallization of the solid residue from ethanol, 1-(5-trifluoromethyl-1,3,4-thiadiazol-2-yl)-3-methyl - 4,5 - di - N - methylcarbamoylimidazolidinone-(2) of the melting point 205° C. was obtained.

EXAMPLE 5

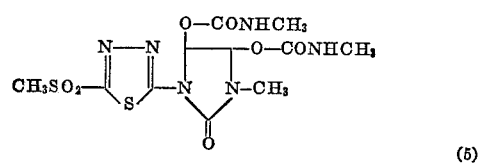

(5)

In manner analogous to that of Example 2, 1-(5-methylsulfonyl - 1,3,4 - thiadiazol - 2 - yl) - 3 - methyl - 4,5-di-N-methylcarbamoylimidazolidinone-(2) of the melting point 255° C. can be prepared.

EXAMPLE 6

Preparation of 1-(5 - trifluoromethyl - 1,3,4 - thiadiazol-2 - yl) - 3 - methyl - 4 - methoxy - 5 - N - methylcarbamoylimidazolidinone-(2)

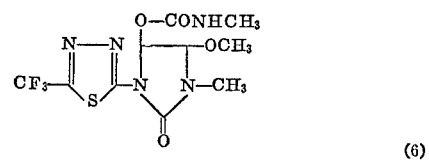

(6)

10 g. (0.175 mole) methylisocyanate are added dropwise at 20° C. to a solution of 44 g. (0.15 mole) 1-(5-trifluoromethyl - 1,3,4 - thiadiazol-2-yl) - 3 - methyl - 4-methoxy - 5 - hydroxyimidazolidinone-(2) in 250 ml. tetrahydrofuran. After heating for 2 hours, concentration in a vacuum is effected. After recrystallization from benzene/hexane, 1-(5-trifluoromethyl - 1,3,4 - thiadiazol-2-yl) - 3 - methyl - 4 - methoxy - 5 - N-methylcarbamoyl-imidazolidinone-(2) was obtained in crystalline form; melting point 161° C.

EXAMPLES 7-21

In a manner analogous to those of the above Examples 1 to 6, the compounds listed below can be prepared. In the list, the compounds are identified by the indication of the meanings of R, $R^1$, $R^2$ and $R^3$ in Formula I.

| Ex. | R | $R^1$ | $R^2$ | $R^3$ | Melting-point (° C.) |
|---|---|---|---|---|---|
| 7 | $C_2H_5SO_2$ | $CH_3$ | $COCH_3$ | $COCH_3$ | 162 |
| 8 | $CH_3S$ | $CH_3$ | $COCH_3$ | $COCH_3$ | 175 |
| 9 | $i\text{-}C_3H_7$ | $CH_3$ | $COCH_3$ | $COCH_3$ | 160 |
| 10 | $CH_3SO_2$ | $CH_3$ | $COCH_3$ | $C_2H_5$ | 130 |
| 11 | $CH_3SO_2$ | $CH_3$ | $COCH_2Cl$ | $C_2H_5$ | 110 |
| 12 | $CH_3SO_2$ | $CH_3$ | $COC(CCH_3)_3$ | $C_2H_5$ | 53 |
| 13 | $CH_3SO_2$ | $CH_3$ | $CO(CH_2)_{10}CH_3$ | $C_2H_5$ | 52 |
| 14 | $CH_3SO_2$ | $CH_3$ | $CO_2C_2H_5$ | $C_2H_5$ | 95 |
| 15 | $CH_3SO_2$ | $CH_3$ | $COCHCl_2$ | $C_2H_5$ | 150 |
| 16 | $CH_3SO_2$ | $CH_3$ | $COC_3H_7$ | $C_2H_5$ | 51 |
| 17 | $CH_3SO_2$ | $CH_3$ | $CO(CH_2)_3Cl$ | $C_2H_5$ | 42 |
| 18 | $CH_3SO_2$ | $CH_3$ | $COCH_2\text{—}CH(CH_3)_2$ | $C_2H_5$ | 36 |
| 19 | $CH_3SO_2$ | $CH_3$ | $CO\text{—}C_6H_4\text{—}Cl$ | $C_2H_5$ | 86 |
| 20 | $CH_3SO_2$ | $CH_3$ | $CO\text{—}C_6H_4\text{—}CH_3$ | $C_2H_5$ | 147 |
| 21 | $t\text{-}C_4H_9$ | $CH_3$ | $COCH_3$ | $COCH_3$ | 161 |

The active compounds according to the invention have excellent herbicidal properties and can therefore be used for the control of weeds. By weeds in the widest sense are meant all plants which grow in places where they are not desired. Whether the substances according to the invention act as total or as selective herbicides depends essentially on the mount applied.

The substances according to the invention can be used for example in the case of the following plants: dicotyledons, such as mustard (Sinapis), cress (Lepidium), cleaver (Galium), common chickweed (Stellaria), mayweed (Metricaria), smallflower Galinsoga (Galinsoga), fat hen (Chenopodium), stinging nettles (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Pannicum), sugare cane (Saccharum).

The compounds are especially suitable for selective weed control in cereals, cotton, sugar-beet and other cultivations. They can advantageously also be used for the control of spring wild oats.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin, sulfite waste liquors and methyl cellulose.

The active compounds according to the invention may be present in the formulations in admixture with other active compounds or may be mixed therewith at the time of application.

The formulations contain, in general, 0.1 to 95, preferably 0.5 to 90, percent by weight of active compound.

The active compounds can be applied as such or in the form of their formulations or of the application forms prepared therefrom, such as ready-to-use solutions, emulsions, suspensions, powders, pastes and granulates. Application may take place in the usual manner, for example by spraying, squirting, dusting or scattering.

When the compounds are applied as total herbicides, the amounts of active compound are generally 20 to 30 kg./hectare. In selective weed control, the applied amounts are generally 0.1 to 10 kg. per hectare, preferably 0.5 to 15 kg./hectare.

The active compounds according to the invention also exhibit fungicidal and insecticidal properties and also act against mosquito larvae.

The invention therefore provides a herbicidal composition containing as active ingredient a compound according to the invention in admixture with a solid diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a solid or liquid diluent or carrier.

The invention is illustrated by the following examples.

EXAMPLE A

Post-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Test plants which had a height of about 5 to 15 cm. were sprayed with the preparation of the active compound so that the amounts of active compound per unit area which are stated in the table were applied. Depending on the concentration of the spray liquor, the amount of water applied lay between 1000 and 2000 litres/hectare. After 3 weeks, the degree of damage to the plants was determined and characterized by the values 0 to 5 which have the following meaning:

0 no effect
1 a few slightly burnt spots
2 marked damage to leaves
3 some leaves and parts of stalks partially dead
4 plant partially destroyed
5 plant completely dead.

The test compounds according to the invention are set forth in the following table.

TABLE

| Compound Number | Chemical name | Structure |
|---|---|---|
| 1 | 1-(5-trifluoromethyl-1,3,4-thiadiazol-2-yl)-3-methyl-4,5-diacetoxyimidazolidinone-(2). | (structure) |
| 2 | 1-(5-trifluoromethyl-1,3,4-thiadiazol-2-yl)-3-methyl-4-methoxy-5-N-methylcarbamoyl-imidazolidinone-(2). | (structure) |
| 3 | 1-(5-trifluoromethyl-1,3,4-thiadiazol-2-yl)-3-methyl-4-methoxy-5-acetoxyimidazolidinone-(2). | (structure) |
| 4 | 1-(5-trifluoromethyl-1,3,4-thiadiazol-2-yl)-3-methyl-4-methoxy-5-methoxycarbonyloxy-imidazolidinone-(2). | (structure) |
| 5 | 1-(5-tert.butyl-1,3,4-thiadiazol-2-yl)-3-methyl-4,5-diacetoxyimidazolidinone-(2). | (structure) |

TABLE A.—POST-EMERGENCE TEST

| Active compound | Active compound applied, kg./hectare | Echinochloa | Chenopodium | Sinapis | Galinsoga | Stellaria | Carrots | Cotton | Wheat |
|---|---|---|---|---|---|---|---|---|---|
| (Known structure) (22) | 4 | 3 | 5 | 5 | 5 | 4 | 1 | 2 | 2 |
|  | 2 | 3 | 4-5 | 4-5 | 4-5 | 3 | 1 | 1 | 1-2 |
|  | 1 | 1 | 4 | 4 | 3 | 2 | 0 | 0 | 0 |
| Compound 1 | 2 | 5 | 5 | 5 | 5 | 5 | 5 | 2-3 | 4 |
|  | 1 | 4-5 | 5 | 4 | 5 | 5 | 5 | 1 | 2-3 |
|  | 0.5 | 4 | 5 | 4 | 4 | 5 | 4-5 | 0 | 2 |
| Compound 2 | 2 | 5 | 5 | 5 | 5 | 5 | 5 | 4-5 | 1-2 |
|  | 1 | 4 | 5 | 5 | 5 | 5 | 4-5 | 4 | 0 |
|  | 0.5 | 4 | 5 | 5 | 5 | 5 | 4 | 3 | 0 |

| | Concentration of active compound, kg./ha. | | | | | | Daucus | | |
|---|---|---|---|---|---|---|---|---|---|
| Compound 3 | 2 | 5 | 5 | 5 | 5 | 5 | 5 | 3 | 2 |
|  | 1 | 5 | 5 | 5 | 5 | 5 | 5 | 1 | 1 |
|  | 0.5 | 4-5 | 5 | 5 | 5 | 5 | 5 | 0 | 1 |
|  | 0.25 | 4 | 5 | 5 | 5 | 5 | 3 | 0 | 0 |
|  | 0.125 | 2 | 4-5 | 4-5 | 5 | 3 | 1 | 0 | 0 |
| Compound 4 | 2 | 5 | 5 | 5 | 5 | 5 | 5 | 3 | 4 |
|  | 1 | 5 | 5 | 5 | 5 | 5 | 4 | 1 | 2 |
|  | 0.5 | 4 | 5 | 5 | 5 | 5 | 3 | 0 | 1 |
|  | 0.25 | 4 | 4-5 | 5 | 5 | 5 | 2 | 0 | 0 |
|  | 0.125 | 2 | 3 | 5 | 4 | 3 | 1 | 0 | 0 |
| Compound 5 | 2 | 5 | 5 | 5 | 5 | 5 | 5 | 5 | 4 |
|  | 1 | 5 | 5 | 5 | 5 | 5 | 5 | 4-5 | 3 |
|  | 0.5 | 5 | 4-5 | 5 | 5 | 5 | 5 | 3 | 3 |
|  | 0.25 | 5 | 4 | 5 | 5 | 5 | 5 | 1 | 2 |
|  | 0.125 | 4 | 1 | 4-5 | 5 | 3 | 4 | 0 | 1 |

EXAMPLE B

Pre-emergence test

Solvent: 5 parts by weight acetone
Emulsifier: 1 part by weight alkylarylpolyglycolether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0 to 5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results are set forth in Table B.

TABLE B.—PRE-EMERGENCE TEST

| Active compound | Concentration of active compound kg./ha. | Echinochloa | Chenopodium | Sinapis | Galinsoga | Stellaria | Matricaria | Cotton | Wheat |
|---|---|---|---|---|---|---|---|---|---|
| Compound 3 | 20 | 5 | 5 | 5 | 5 | 5 | 5 | 5 | 5 |
|  | 10 | 5 | 5 | 5 | 5 | 5 | 5 | 4 | 5 |
|  | 5 | 5 | 5 | 5 | 5 | 5 | 5 | 3 | 5 |
|  | 2.5 | 5 | 5 | 5 | 5 | 5 | 5 | 2 | 5 |
|  | 1.25 | 5 | 4-5 | 5 | 5 | 5 | 5 | 0 | 4-5 |
| Compound 5 | 20 | 5 | 5 | 5 | 5 | 5 | 5 | 3-4 | 3 |
|  | 10 | 5 | 5 | 5 | 5 | 5 | 5 | 3 | 2 |
|  | 5 | 5 | 4-5 | 4-5 | 5 | 5 | 5 | 2 | 1 |
|  | 2.5 | 4 | 4 | 3-4 | 5 | 4 | 5 | 0 | 0 |
|  | 1.25 | 3 | 2-3 | 2 | 5 | 3 | 5 | 0 | 0 |
| Compound 1 | 20 | 5 | 5 | 5 | 5 | 5 | 5 | 4-5 | 5 |
|  | 10 | 5 | 5 | 5 | 5 | 5 | 5 | 4 | 4-5 |
|  | 5 | 5 | 5 | 5 | 5 | 5 | 5 | 4 | 4-5 |
|  | 2.5 | 5 | 5 | 5 | 5 | 5 | 5 | 2 | 4 |
|  | 1.25 | 2 | 2 | 4 | 5 | 5 | 3 | 1 | 3 |
| Compound 2 | 20 | 5 | 5 | 5 | 5 | 5 | 5 | 5 | 5 |
|  | 10 | 5 | 5 | 5 | 5 | 5 | 4-5 | 5 | 5 |
|  | 5 | 5 | 5 | 5 | 5 | 5 | 4-5 | 4 | 4-5 |
|  | 2.5 | 4-5 | 5 | 5 | 4-5 | 5 | 4 | 3 | 4 |
|  | 1.25 | 4 | 4-5 | 4 | 4-5 | 5 | 3 | 2 | 4 |

It will be understood that the specification and examples are illustrative but not limitative of the present invention and that other embodiments with the spirit and scope of the invention will suggest themselves to those skilled in the art.

What is claimed is:

1. 1 - (1,3,4-thiadiazol-2-yl)-imidazolidinone-(2) compound of the formula:

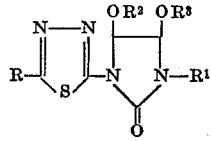

in which

R is alkyl, perfluoroalkyl, alkylthio, or alkylsulfonyl, each having not more than 4 carbon atoms;
$R^1$ is alkyl having not more than 4 carbon atoms;
$R^2$ is an acyl radical of the formula $R^4$ —CO— wherein $R^4$ is alkyl having up to seventeen carbon atoms, chloroalkyl having not more than 4 carbon atoms, phenyl optionally substituted by methyl or chloro, or alkylamino having not more than 4 carbon atoms; and
$R^3$ stands for any of the radicals for which $R^2$ may stand or for alkyl having not more than 4 carbon atoms.

2. Compound as claimed in claim 1 wherein R is perfluoroalkyl.

3. Compound as claimed in claim 1 wherein R is alkyl of from 1 to 4 carbon atoms.

4. Compound as claimed in claim 1 wherein R is alkylthio of from 1 to 4 carbon atoms in the alkyl moiety.

5. Compound as claimed in claim 1 wherein R is alkylsulfonyl of from 1 to 4 carbon atoms.

6. Compound as claimed in claim 1 wherein $R^4$ is alkyl of up to seventeen carbon atoms.

7. Compound as claimed in claim 1 wherein $R^4$ is chloro-alkyl of up to 4 carbon atoms.

8. Compound as claimed in claim 1 wherein $R^4$ is phenyl.

9. Compound as claimed in claim 1 wherein $R^4$ is methylphenyl.

10. Compound as claimed in claim 1 wherein $R^4$ is chlorophenyl.

11. Compound as claimed in claim 1 wherein $R^4$ is alkyl of up to 4 carbon atoms.

12. Compound as claimed in claim 1 designated 1-(5-trifluoromethyl - 1,3,4 - thiadiazol - 2 - yl) - 3 - methyl-4,5-diacetoxyimidazolidinone-(2).

13. Compound as claimed in claim 1 designated 1-(5-trifluoromethyl - 1,3,4 - thiadiazol - 2 - yl) - 3 - methyl-4-methoxy-5-N-methylcarbamoylimidazolidinone-(2).

14. Compound as claimed in claim 1 designated 1-(5-trifluoromethyl - 1,3,4 - thiadiazol - 2 - yl) - 3 - methyl-4-methoxy-5-acetoxyimidazolidinone-(2).

15. Compound as claimed in claim 1 designated 1-(5-trifluoromethyl - 1,3,4 - thiadiazol - 2 - yl) - 3 - methyl-4-methoxy-5-methoxycarbonyloxy-imidazolidinone-(2).

16. Compound as claimed in claim 1 designated 1-(5-tert.butyl - 1,3,4 - thiadiazol - 2 - yl) - 3 - methyl - 4,5-diacetoxyimidazolidinone-(2).

References Cited

Mayer et al., Chem. Abstracts, 73:77248b (1970).

RICHARD J. GALLAGHER, Primary Examiner

U.S. Cl. X.R.

71—90